March 31, 1942.  F. W. HALL  2,278,369
LAMINATED GLASS
Filed June 23, 1939
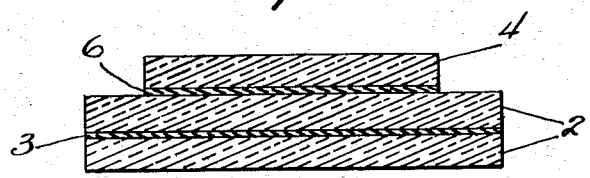
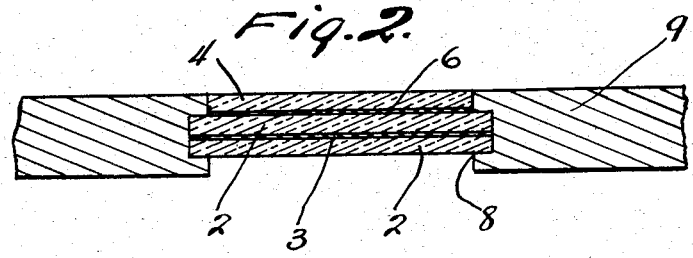
INVENTOR
FRANK W. HALL
BY Olew E. Bee
ATTORNEY Patented Mar. 31, 1942

2,278,369

UNITED STATES PATENT OFFICE 2,278,369

LAMINATED GLASS

Frank W. Hall, Brackenridge, Pa., assignor to Pittsburgh Plate Glass Company, Allegheny County, Pa., a corporation of Pennsylvania Application June 23, 1939, Serial No. 280,733

1 Claim. (Cl. 20—40)

The present invention relates to laminated glass and more particularly to safety glass designed to serve for the glazing of vehicles.

One object of the present invention is the provision of a laminated glass which, when installed in a suitable frame, will have a surface flush with the surface of the frame.

Other objects and advantages of the invention will become more apparent from the following detailed description of a preferred embodiment thereof.

Laminated glass is necessarily used in glazing automobiles and airplanes where there is considerable hazard of accident. The fact that laminated glass does not shatter when broken provides a great measure of protection for the occupants of the glazed vehicles.

In airplanes, another factor must be considered. A standard plate of laminated glass, when installed in the fuselage, interrupts the smooth contour thereof and increases the wind resistance and wind noise around the window frames. Under the demands of modern high speed transportation conditions of this type must be obviated.

It has been proposed to bevel or undercut one ply of the laminated plate in order that the surface of the plate would be flush with the surface of the frame. Obviously, such procedure will reduce the safety factor incident to the use of laminated glass since the plate is held within the frame by only one layer of glass. While it may be true that the glass itself would not be shattered upon impact, nevertheless there is a possibility of the entire plate being disengaged from the frame.

Briefly stated, the present invention contemplates the fabrication of a laminated plate from two plates of glass of similar dimensions to which a third plate of glass of lesser surface area is adhered.

One embodiment of my invention is shown in the accompanying drawing wherein: Figure 1 is a vertical sectional view of a plate of laminated glass and Figure 2 is a vertical sectional view illustrating the application of my laminated glass as a closure.

Referring to the drawing plates 2 of glass are adhered to the opposite sides of a sheet 3 of non-brittle material. The glass plates 2 are of similar dimensions and may be of ground and polished, or drawn window glass. A third plate 4, of glass, is adhered to the exterior surface of one of the plates 2 by means of a layer 6 or sheet of non-brittle material. The cover plate 4 has a lesser surface area than the plates 2, in order that its edges will be offset from the main body of the laminated plate.

The advantages of these provisions become evident when the laminated plate is installed within an opening 8, provided in a wall section 9 of a vehicle, such as an airplane. The main body of the laminated plate is firmly held within the opening 8 by means of any suitable framework adapted to support and secure it therein. The position of the frame is adjusted so that the outer surface of the laminated plate will be flush with the outer surface of the vehicular body. This installation eliminates any breaks in the surface which would increase wind resistance. In addition it should be pointed out that the glazing retains all of the strength of a normal laminated glass in that the main body of the laminated plate is secured within the frame and its resistance to dislodgment remains normal.

A three-ply laminated glass as provided by my invention may be fabricated by any of the standard methods of manufacture wherein the several laminae are united together. If it is desired three plates of glass of the same size may be adhered together and subsequently one of the outer plates reduced in size by cutting to provide the offset edge. Less trouble will be experienced, however, by cutting the cover plate to the proper size before assembling and laminating the layers. It is not necessary that the glass be cut to exact size before lamination since any trimming incident to installation can be accomplished with the same facility as is now experienced with ordinary safety glass.

While I have shown my new laminated glass as comprising three plates of flat glass, it should be understood that curved or bent plates of glass may be substituted therefor where such glass will be more appropriate for the intended installation.

The nature of the plastic reinforcing material is of little moment to the present invention and interlayers of different materials may be used in fabricating the plate. Cellulose nitrate, cellulose acetate, acrylates and vinyl resins may be used singly or in combination. Since it is preferred that the laminated glass have the greatest possible strength a vinyl acetal resin is normally used, although this does not preclude the substitution of other plastics therefor.

It will at once be obvious that various modifications in the composition and arrangement of the several elements are possible without departing from the spirit of the invention or the scope of the appended claim.

What I claim is:

In a wall construction, a plate of laminated glass comprising two sheets of glass united to a layer of plastic material and a third sheet of glass of lesser surface area than the first sheets of glass adhered to one side thereof the first sheets of glass being mounted in a suitable marginal support within an opening in the wall and set inwardly from the outer wall surface to provide an indented area, the third sheet of glass substantially filling the indented area and having its face flush with the outer wall surface.

FRANK W. HALL.